UNITED STATES PATENT OFFICE.

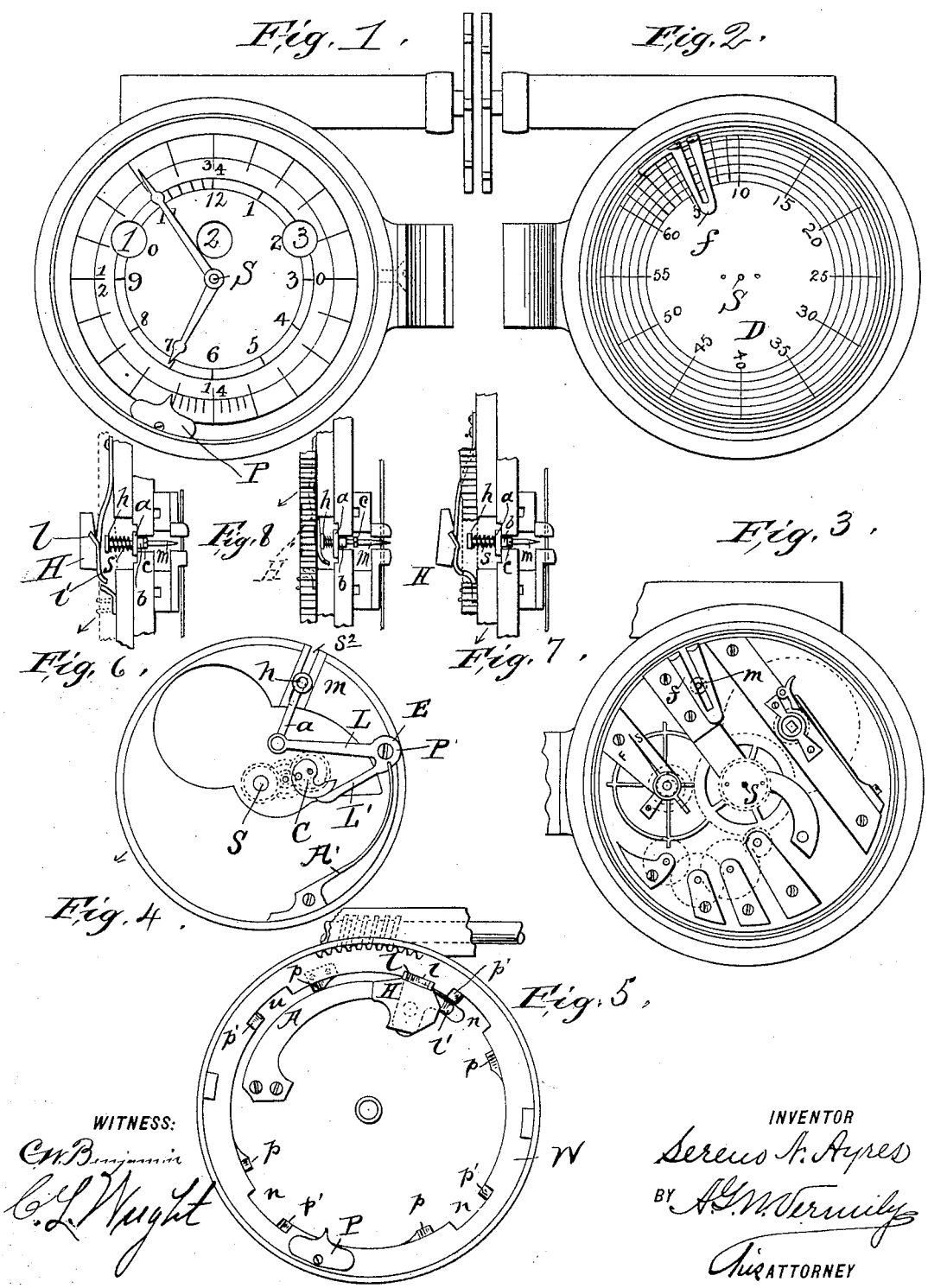

SERENO N. AYRES, OF NEW YORK, N. Y.

INSTRUMENT FOR MEASURING TIME AND DISTANCE.

SPECIFICATION forming part of Letters Patent No. 594,820, dated November 30, 1897.

Application filed April 28, 1896. Serial No. 589,385. (No model.)

*To all whom it may concern:*

Be it known that I, SERENO N. AYRES, a citizen of the United States of America, and a resident of the city of New York, in the county and State of New York, have invented certain new and useful Improvements in Instruments for Measuring Time and Distance, of which the following is a specification, reference being had to the accompanying drawings, forming part of the same, in which—

Figure 1 represents the dial-face of a cyclometer to which my invention has been added. Fig. 2 is a reverse face view of the meter, showing the record-keeping tablet or disk. Fig. 3 is a substantially similar view of the meter, but without the tablet. Fig. 4 is a plan view of the shifting mechanism I employ to alter the position of the marker as the tablet moves around. Fig. 5 shows the main wheel of the distance-recording mechanism and the modification therein I have devised to cause it to operate the marker. Fig. 6 is an enlarged view of the marker, the operating-hammer, and adjacent parts, showing them in the position they occupy when neither marker nor hammer is in action. Fig. 7 is a view of the same parts, showing the hammer retracted to add force to its blow; and Fig. 8 shows the parts in the position they occupy when the blow has been delivered and before the hammer and the marker have recovered their normal quiescent positions.

The invention relates principally to mechanism for simultaneously recording two facts—
for instance, a distance traveled and the time occupied in doing so—or it might be used for recording the number of blows delivered by a drill and the time occupied or time and number in almost any application.

I have shown the device as applied to a cyclometer, such a one as would be useful in recording the distance traveled by a bicycle; but I do not limit myself to such a combination. As shown, it will render the rider the service of a timepiece, being readily secured in such position that it can be easily seen from the saddle, and at the same time will make a permanent detailed and detachable record of the distance traveled and the time consumed between the completion of each quarter of a mile of that distance. Thus if after completing twelve miles at 9.17 a rest of twenty-five minutes should be taken and the next quarter ridden in a minute the record would show that twenty-six minutes elapsed between completing the twelve miles and completing twelve and a quarter miles, or that twenty-five minutes more than necessary was taken for this thirty-seventh quarter, creating a very efficient check on one sent on an errand.

The mechanism of the cyclometer is well known and its full description unnecessary.

In this form a pointer P revolves about the dial-center once for each mile traveled by the machine, indicating by its location the part traversed, and registry-wheels with appropriate figures exposed through openings in the dial-face, as shown, indicate how many times the pointer has completed its revolutions. To such mechanism I have added a time-movement, so arranged that I may use the same dial for it that I also use for the distance-recorder by making a combination of a time and a cyclometer dial, the watch-hands moving over it and indicating the time as the pointer and the figures do the distance.

Upon the center spindle S of the time-movement and preferably at the rear face, that it may be conveniently adjusted or removed, I mount a record-holding disk or tablet D, (preferably of paper,) so arranged that it shall turn completely around once each hour, (or other given interval, preferably in unison with the minute-hand,) that being most convenient for purposes of ready reading and also operation, as its movement need only be timed with the minute-hand spindle of the time-movement, and this may be effected by securing it so as to turn with that spindle. This tablet is by me usually divided into spaces, such as equal the travel of the disk during one minute, by radial lines, as shown, and for convenience in reading I have numbered the fifth lines sequentially "5," "10," "15," &c., to "60." It is also provided with other lines concentric or spiral for a purpose to be presently described. Division into other than minute-spaces might be substituted for the radial lines shown, if desired.

Supported in an arm *a*, which is here shown as pivoted to one arm of an elbow-lever E, I provide a marker *m*, a needle-point with an enlarged head to retain a spring *s* between it and the arm $a$, that the needle may be withdrawn after action, and a collar $c$, which limits the return motion of the needle by engagement with the lower end of a socket-bearing $b$, connected to arm $a$, to insure the movement of the needle $m$ in right lines. The marker is preferably mounted on the side of the watch-plate farthest from the tablet and extends through a slot $s^2$, cut in said plate, but not necessarily. To prevent the blow from disarranging the tablet, I secure a slotted finger $f$ to the bridge of the movement in such position that it will extend inward over the disk and its slot will register with the path of the needle or marker $m$. The tablet might be fixed and the marker revolve with substantially similar results.

Within the line of the main wheel W of the meter on a spring-arm A, I mount the hammer H immediately over the head $h$ of the marker, but normally not in contact with it. This hammer or its lever is provided with a double lug or two single lugs $l$ $l'$. The part $l$ extends beyond the interior line of the annular wheel W and, resting upon it, insures the hammer shall not touch the marker-head except when desired. The other part $l'$ extends a little beyond and below the hammer-head and registers with a set of inclined planes $p$, secured to the wheel W, one before each point in the wheel which is intended to be opposite the hammer when a blow is struck. Finally, one or more notches $n$ are cut in wheel W, one for each time the marker is intended to act during the revolution of wheel W, here four evenly spaced, that the time occupied in going each quarter-mile may be accurately recorded. These notches are of a size and shape to permit the entry of the lugs $l$ a distance sufficient to cause the hammer to strike the needle-marker and drive its point through the tablet, and yet such that the lug $l$ will engage with the inclined planes $p'$ at the rear of the notches.

The operation is evident: As the wheel W, driven by the worm-gear connected to the actuating part, turns around the plane $p$ comes under lug $l'$ and, carrying it upward, forces back the hammer against the stress of spring-arm A. Just as the machine completes a quarter-mile (or a mile, if so arranged) the lug $l$ comes over a notch $n$, lug $l'$ slips off the high point of plane $p$, the hammer descends, delivers its blow, and the marker is driven through the tablet, leaving a minute-mark therein, say at the radial line marked "5." The hammer and needle spring back into normal position, the inclined plane $p'$ at the rear of the notch $n$ insuring this if the spring should fail to act. The motion continues, and as another quarter is completed the needle is again driven through the paper, say, at the next radial line. Then the rider knows that that quarter of a mile was ridden in just one minute, and so the record will continue, a prick in the paper marking the completion of each quarter-mile and thus preserving an absolutely correct and automatically-taken record of the distance covered and time occupied, provided for in the arrangement. It also tells the number of miles ridden, for the number of punctures divided by four always gives that record independent of the instantaneously-read index on the face, already described. I usually cut the notch $n$, into which the hammer-lug descends at the completion of the mile, a little longer and so set the plane $p'$ at the rear that the needle-point may be driven farther down, and being tapered may make a larger puncture for the mile-mark than when it marks the quarter, for purposes of convenience in reading the record. With such arrangement the counting of the large punctures alone will tell the miles traveled.

To use as a stop-watch, the automatic movement of the marker is unnecessary.

It is not convenient to divide the disk by radial lines as closely set as would be required to record a long run by merely one rotation of the disk. If it were arranged to turn but once in twelve hours, the punctures would be so close on any disk of practicable diameter that they would be scarcely distinguishable one from the next. I have therefore arranged it should rotate once an hour and the division-lines should correspond to divisions of that interval. If no further device were provided, the disk would need to be changed each hour, and such a necessity would be very unpopular. I have therefore arranged that the disk shall hold the record of a series of hours (here twelve) by causing the marker to assume a different radial position each hour, (or other suitable interval.) It thus happens that the recording-punctures of each hour are in substantially different and concentric circles, (really one long scroll,) and I am enabled on one tablet to make the record of many more hours than could feasibly be done with a stationary marker. This is accomplished as follows: The arm $a$, carrying the marker $m$, is mounted, as stated, on an elbow-lever E, pivoted at P', preferably near the rim of the case. A short distance from the center I mount a cam C, which engages the second arm L' of the elbow-lever E, and by making this second arm L' shorter than the first arm L, I get a greater movement of the end of arm L than the swing of the cam would otherwise provide. This cam is turned on its pivot P' once in twelve hours (or other predetermined interval) by means of a train of gears operated from the central or other spindle of the time mechanism. A spring A' holds the arm L' against the cam C and returns the marker to its outermost position when the arm L' drops off the high point of the cam.

I might operate the arm $a$ from the cam direct and might operate the cam from some other spindle than the one designated, notably the hour-wheel of the time mechanism, the absolute requisites being mechanism that will move the marker across its designated path in the designated time, but I prefer the mechanism described, as it enables me to accomplish the desired result without such stress as would interfere with the correct running of the time mechanism, which would result were the action of a spring such as A' arranged to be directly opposed to the motion of the hand indicating the time.

The marker, by the mechanism described, will be continually moving from its outer limit of motion to its inner limit, and its movement being regular it will move over one-twelfth of the distance in one hour and (if the machine is running the whole time) will of course leave a trail of twelve circles of punctures or, rather, a spiral of twelve convolutions marked by punctures, and to render reading easier I have divided the space on the disk or tablet which moves under the marker by lines, it being intended that during the first hour the punctures shall be without the first line, then between it and the second line during the second hour, &c. In ordinary practice, however, I find that the eleven lines required to separate twelve spaces would be so close together as to confuse, and I therefore use but six, the space between any two being therefore occupied by the punctures made during two hours. Instead of a series of circles I might make a continuous spiral line, with the requisite number of convolutions to accomplish the desired purpose. I set the marker and the disk or tablet in such position that at the beginning of the twelve hours the record of which it is intended the disk shall receive the marker is at its outward limit of movement and the radial line indicating the beginning of the first minute of the time to be indicated shall lie immediately under the marker, such arrangement insuring the ready reading of the record for the twelve hours when completed and uniformity in the reading of a series of such tablets used one after the other.

The head of the hammer H is sufficiently wide to strike the head $h$ of the marker whether that be at the outward or inward limit of variation or at any intermediate point.

What I claim as my invention, and desire to secure by Letters Patent, is—

1. The combination with a regular moving mechanism of a record-tablet moved by said mechanism across a given point, a marker, a hammer, a second moving mechanism for operating said marker and engaging devices for intermittently holding said hammer from engaging the marker-head, all substantially as set forth.

2. The combination with a cyclometer-wheel provided with one or more notches, each provided with an inclined plane at one side, of a hammer provided with a lip extending over the rim of said wheel and adapted to enter the notch and engage the inclined plane thereof, a marker in line with said hammer, a tablet carried with regularity under the marker and mechanism substantially as described for moving said tablet, all substantially as set forth.

3. The combination with a double mechanism substantially as described of a circular moving tablet connected with the time-movement, a marker mounted on a movable arm, an elbow-lever mounted in the case, one end connected to the arm of the marker and the opposite end bearing against a cam, said cam, gears connecting said cam to the time-movement and means substantially as set forth for operating the marker to mark the tablet, all substantially as set forth.

4. The combination with a double mechanism substantially as described of a circular moving tablet connected with the time-movement, a marker mounted on a movable arm, an elbow-lever, with arms of different length, mounted in the case, the longer end connected to the arm of the marker and the opposite end bearing against a cam, said cam, gears connecting said cam to the time-movement and means substantially as set forth for operating the marker to mark the tablet, all substantially as set forth.

5. The combination with a double mechanism substantially as described of a circular moving tablet connected with a time-movement, a marker mounted on a movable arm, an elbow-lever mounted in the case, one end connected to the arm of the marker and the opposite end bearing against a cam, said cam, gears connecting said cam to the time-movement, a spring bearing against said lever oppositely to the stress of the cam and means substantially as set forth for operating the marker to mark the tablet, all substantially as set forth.

6. The combination with a cyclometer-wheel provided with one or more notches, of a hammer, provided with a lip extending over the rim of said wheel and adapted to enter a notch, a second lip depending within the line of the wheel, an inclined plane also within said line and adjacent to the notch, a marker in line with said hammer, a tablet carried with regularity under the marker and mechanism substantially as described for carrying said tablet, all substantially as set forth.

In testimony that I claim the foregoing as my invention I have signed my name, in presence of two witnesses, this 22d day of April, 1896.

SERENO N. AYRES.

Witnesses:
C. L. WRIGHT,
A. G. N. VERMILYA.